April 27, 1954 G. A. TINNERMAN 2,676,635
FASTENING DEVICE
Original Filed Feb. 27, 1948
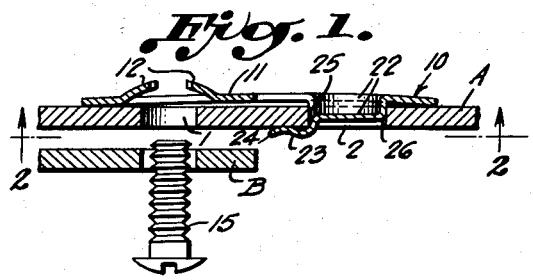
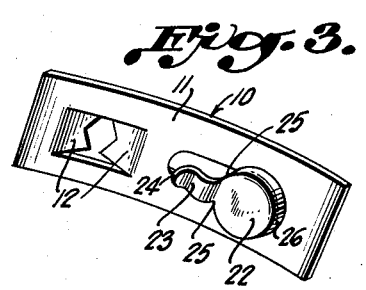
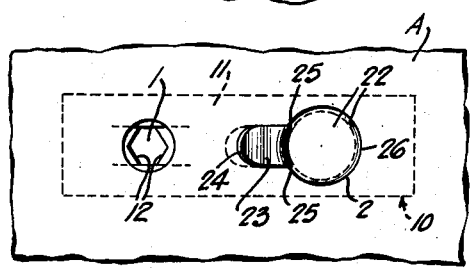
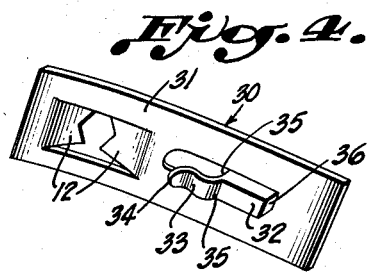
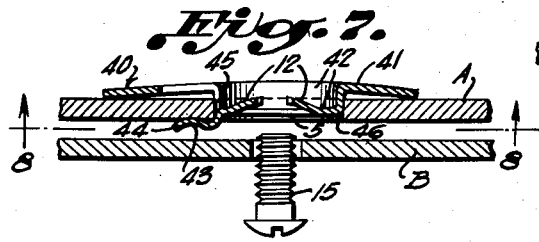
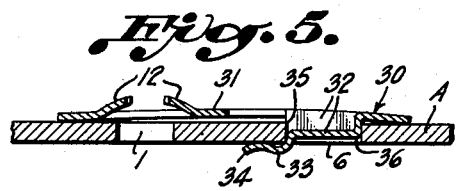
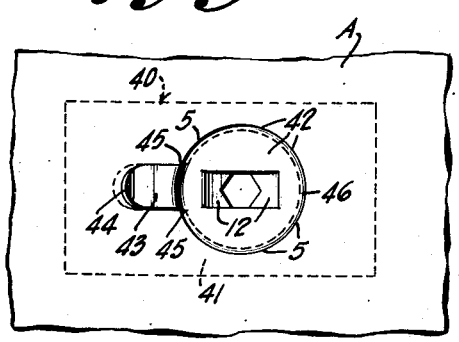
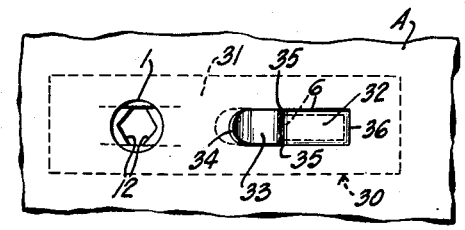
INVENTOR
GEORGE A. TINNERMAN
BY H. G. Lombard
ATTORNEY

Patented Apr. 27, 1954

2,676,635

UNITED STATES PATENT OFFICE 2,676,635

FASTENING DEVICE

George A. Tinnerman, Cleveland, Ohio, assignor to Tinnerman Products, Inc., Cleveland, Ohio, a corporation of Ohio Original application February 27, 1948, Serial No. 11,759. Divided and this application November 27, 1950, Serial No. 197,756

7 Claims. (Cl. 151—41.75)

This invention deals with attachable types of fastening devices designed for ready attachment to an apertured supporting part to provide the same with means for securing a cooperating part thereto or for securing another structure, object or article of manufacture to said supporting part. The invention is directed, more particularly, to clip fastening devices which comprise means for attaching the fastener to a supporting part together with means for threadedly engaging a bolt or screw fastener to secure a cooperating part to the supporting part, or other holding means for retaining an object or part in secured relation to the supporting part. This application is a division of prior copending application Ser. No. 11,759, filed February 27, 1948.

The improved fasteners of the invention are of the general type having attaching means which comprise a hook or the like which is applied to clasping engagement with the edge portion of an assembling opening in a part together with a locking shoulder also receivable in the assembling opening to lock the fastener in applied fastening position. Frequently the attaching opening in which the fastener is attached to a part is exposed on the outer side of the installation whereupon there is a tendency for water, dust, and other foreign matter to pass through the attaching opening into the interior of the assembly. In automobile installations, for example, this is highly objectionable inasmuch as the entrance of such water, dust and other foreign matter into the interior of the vehicle body results in damage to the upholstery, trim material, etc.

A primary object of the invention, therefore, is to provide various forms of improved attachable clip fasteners of the character described which are designed for attachment in an assembling opening in a supporting part in such a way that the fastener completely covers and closes the assembling opening and thereby prevents the passage of water, dust and other foreign matter through such assembling opening.

A further object of the invention is to provide such a fastening device having an improved type of attaching means by which the assembling opening is rendered impervious to the passage of water, dust and other foreign matter and which attaching means are so designed as to be easily and quickly slid into applied position in interlocked engagement with the supporting part to retain the fastener in fastening position against inadvertent displacement or accidental removal.

Another object of the invention is to provide an improved fastener such as described which is adapted for a leak-proof and dust-proof attachment in an assembling opening in a part and which comprises an attaching hook or the like and a cooperating imperforate protuberance defining an imperforate locking shoulder which locks the fastener in such attached position against loosening or removal and otherwise closes said assembling opening against the passage of water, dust and other foreign matter.

A further object of the invention is to provide various forms of attachable fasteners, as aforesaid, which are adapted for attachment to supporting parts of various thicknesses.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a sectional view of a fastening assembly for securing superposed apertured parts showing one form of the improved fastener as attached to its supporting part, and a cooperating bolt or screw about to be applied thereto to secure the parts of the installation;

Fig. 2 is a view of Fig. 1 as along line 2—2, showing in bottom plan the fastener of Fig. 1 as attached to the supporting part; and, Fig. 3 is a perspective view of the fastener shown in Figs. 1 and 2 as viewed from the underside thereof.

Fig. 4 is a perspective view of an alternate form of the fastener as seen from the underside thereof and in which the attaching means is designed for application to a rectangular assembling slot in a supporting part;

Fig. 5 is a sectional view of a fastening assembly showing the fastener of Fig. 4 as attached in a rectangular assembling slot in the supporting part; and, Fig. 6 is a bottom plan view of the fastening assembly shown in Fig. 5.

Fig. 7 is a sectional view of a fastening assembly showing another form of the improved fastener of the invention which is attached in the same opening through which the bolt or screw fastener is applied; and, Fig. 8 is a view along line 8—8 of Fig. 7 showing in bottom plan the part to which the fastener of Fig. 7 is attached.

The improved fastening devices of the invention are of general utility and may be readily designed as necessary for use in various installations in proportion to the size and contour of the parts secured. The fastening devices are particularly suited for use in providing an apertured supporting part with means for securing a cooperating part thereto by an operation taking place entirely from one side thereof as required in a blind location, for example. In this relation, each form of the invention relates to the provision of a fastening device having screw threaded fastener receiving means and otherwise comprising an attaching means designed to hold the fastening device in a self sustaining fastening position on the supporting part preparatory to the application of a threaded fastener thereto for securing a cooperating part to such supporting structure. In any form, the fastener comprises an improved attaching means which completely covers and closes the assembling opening in which the fastener is attached and thereby prevents the passage of water, dust and other foreign matter through such assembling opening.

Referring now, more particularly, to the drawings, Figs. 1–3, inclusive, show a preferred embodiment of the improved fastener which comprises a strip, plate or other sheet metal body provided with threaded fastener receiving means for threadedly engaging a bolt or screw for securing superposed apertured parts. The supporting part A to which the fastener is attached may be of any suitable material such as sheet metal, wood, fiber board or the like; however, inasmuch as the instant invention is employed mainly in metallic structures, the same is usually in the form of a metallic panel or plate-like element provided with the necessary perforations along which the object or part to be secured thereto extends in mounted position thereon. In order to adapt the part A for use with the fastening device, a bolt passage 1 is provided therein together with a circular assembling opening 2 at a point suitably spaced from said bolt passage.

The fastener, designated generally 10, comprises a relatively small, inexpensive blank of sheet metal which is best provided in the manner of a simple, rectangular section severed from standard sheet metal strip stock without loss or waste of material. Any suitable sheet metal may be employed but preferably that of a spring metal nature such as spring steel or cold rolled steel having spring characteristics and otherwise of a much greater tensile and compressive strength than the supporting part A to which the fastening device is attached. The fastening device may assume any desired shape or configuration, and in any form defines a base or body 11 which is preferably slightly arched or bowed and provided with integral bolt or screw thread engaging means 12 adapted to receive a threaded fastener 15 for securing the superposed apertured parts A, B, in an installation such as shown in Fig. 1, for example.

In the form of invention shown in Figs. 1–3, inclusive, an end portion of the sheet metal body 11 is provided with integral tongues 12 or similar bolt engaging means which are pressed, extruded, or otherwise struck and formed to project upwardly out of the plane thereof for threadedly engaging a bolt or screw fastening substantially in the manner of a nut. Preferably the sheet metal body 10 is so formed in the stamping operation as to present an upwardly bowed, generally concave resilient base 11 from which said tongues 12 extend upwardly in substantially ogee formation with the extremities thereof so spaced as to lie on a helix corresponding substantially to the pitch of the threads of the screw fastening employed for most effective, uniform threaded engagement therewith.

The thread engaging elements 12 are best provided in the sheet metal body by an aperture intermediate spaced parallel slits which form cooperating tongues, or the like, having spaced extremities defining the desired thread or thread opening corresponding substantially to the root of the bolt or screw for threadedly engaging the thread thereof. Said tongues 12 otherwise are preferably formed to project outwardly out of the plane of the generally bowed fastener base and are bent lengthwise in substantial ogee formation to provide for the maximum strength obtainable to withstand the tightening action of the bolt or screw as it is advanced to final applied fastening position.

Such thread engaging means may be pressed, stamped, extruded, or otherwise provided on the fastener in any suitable form or construction so long as the same threadedly engage with the thread of the bolt or screw and, in this relation the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues 12 as shown, are highly efficient and most practical in that they are possessed of unusual inherent strength and will not collapse or pull through when the bolt or screw 15 is tightened, nor loosen under continuous strain and vibration in the installation. This takes place by reason of the fact that the sheet metal material from which such tongues are formed is of less thickness than the pitch or spacing between adjacent thread convolutions on the bolt or screw, wherefore the extremities of said tongues tend, more effectively, to move toward each other and dig into the grooves intermediate adjacent thread convolutions when tightened and otherwise become embedded in the root of the bolt or screw in locked, frictional fastening engagement therewith.

Thus, in the present example, the tongues 12 are shown as extending outwardly out of the plane of the fastener base 11 in substantial ogee formation and provided preferably with notched extremities, defining substantial biting jaws adapted to cut into the root of the bolt and the adjacent thread surfaces thereon in positive locking relation therewith in the most effective manner. There is thereby eliminated the necessity for a separate, auxiliary locking means such as a lock nut or lock washer and this, in mass production methods of assembly makes possible considerable savings not only in the cost of such locking devices, but also, in the expense and labor involved in the tedious, time-consuming assembling operations and other added steps in manufacture which such auxiliary locking means require. It is to be understood, however, that the present invention is not limited in any manner or form to the illustrated construction of the thread engaging means but rather, comprehends also, various other similar and related form of such tongues or equivalent thread engaging elements.

The attaching elements of the fastener are designed to hold the fastener in self-sustained position on the supporting part A, as shown in Fig. 1, with the stud engaging tongues 12 in alignment with the bolt opening 1 therein preparatory to the application of the bolt or screw 15 in securing a cooperating part B to said supporting part A by an operation taking place entirely from the outer side of the installation. To this end, the fastener comprises, preferably, a generally arched base 11 provided with an imperforate depression in the form of a button-like, hollow cylindrical protuberance 22 which is drawn from said fastener base 11 to project from the underside thereof. The hollow protuberance 22 is formed to correspond substantially to the contour of the circular assembling opening 2 to define an annular hollow plug which snugly and frictionally engages substantially the entire peripheral wall of the assembling opening 2 under spring tension. The cylindrical protuberance 22 carries a resilient hook or attaching tongue 23 stamped from the fastener base and partially from the adjoining portions of said protuberance 22; said hook 23 extends in spaced relation to the fastener base a distance approximating the thickness of part A with the free end of said hook 23 preferably formed into an outwardly flared lip 24. The peripheral surface portions of the cylindrical depression 22 on either side of said hook or attaching tongue 23 define shoulders or abutments 25 adapted to engage snugly the adjacent wall portions of the circular assembling opening 2 while the diametrically opposite surface portions of said depression define a cooperating rounded shoulder or detent 26 for snugly engaging an opposing wall portion of said circular assembling opening 2.

With the fastener 10 thus provided and the supporting part A prepared with the bolt opening 1 and the assembling opening 2, Figs. 1 and 2, the fastener may be easily and quickly attached to positive locked fastening position on said supporting part A with the thread engaging tongues 12 thereof aligned with said bolt opening 1 in said supporting part A. This is effected simply by inserting the free end of the resilient hook or attaching tongue 23 into and through said assembling opening and sliding the fastener in the direction of the free end of said hook 23. The flared lip 24 on the extremity of said hook 23 facilitates this initial step in applying the hook 23 over the edge of said assembling opening 2. By pressing on and flexing the bowed or arched base or body 11 of the fastener and simultaneously sliding the fastener forward, the hook 23 clears the underside of the supporting part A and permits the fastener to be advanced to its fully applied fastening position in which the shoulders or abutments 25 of the protuberance 22 snugly engage the adjacent wall of said assembling opening, substantially as shown in Figs. 1 and 2. In this position, the protuberance 22 is fully received in the assembling opening 2 in snug engagement with the peripheral wall of said assembling opening 2 and with the imperforate shoulder or detent portion 26 thereof in engagement with an opposing wall portion of said assembling opening 2 to lock the fastener in fully applied fastening position on the supporting part A.

A fastener of this character is advantageously formed with the slightly bowed or arched base 11 in that the fastener body is thus provided with added resiliency permitting attachment thereof to supporting parts of different thicknesses inasmuch as such a bowed or arched fastener body may be depressed as necessary to permit the hook 23 to engage positively at the reverse side of any suitable supporting part in self-sustained fastening position thereon. In the event that it is desired to remove the fastener from attached position, a suitable tool is employed to wedge the attaching portion from the supporting structure as necessary to displace the protuberance 22 from its abutting relation with the wall of the assembling opening 2, whereupon the fastener may be slid reversely to disengage the attaching hook 23 from the assembling opening 2 and permit the fastener to be removed. It will be appreciated that in the use of these one-piece fastening devices of the invention, fastening installations are provided which are relatively light in weight and superior and more advantageous in many respects than those secured by clinch-on nut devices embodying conventional threaded nuts which require not only lock washers in providing a locked assembly, but also some extraneous means such as spot welding, riveting or cage devices to retain the nuts in applied position on the support preparatory to the application of the bolt fastening thereto.

Figs. 4–6, inclusive, disclose a fastening construction similar to that just described as designed for application to an assembling opening in the form of a rectangular slot 6, Figs. 5 and 6. The fastener 30, in this instance, also is of the general character of that described with reference to Figs. 1–3, inclusive, and comprises an imperforate hollow protuberance or depression which is drawn from the generally arched fastener base 31 to define a hollow rectangular plug or projection 32 on the underside of the fastener base corresponding substantially to the contour of the rectangular assembling slot 6 in the supporting part A. The hollow rectangular plug or projection 32 carries a resilient hook or attaching tongue 33 stamped from the fastener base and partially from the adjoining end of said hollow plug 32 and which extends in spaced relation to the fastener base 31 a distance approximating the thickness of part A, with the free end of said hook or attaching tongue 33 preferably formed into an outwardly flared lip 34. The adjacent end edges of the hollow rectangular plug 32 on either side of the hook or attaching tongue 33 define shoulder elements or abutments 35 adapted to engage the adjacent end wall of the assembling slot 6 while the diametrically opposite end of said hollow plug defines a cooperating flat shoulder or detent 36 for snugly engaging the opposing end wall of said assembling slot 6. The use of the fastener 30 in this form of the invention, as applied to the rectangular assembling slot 6 in the supporting part A, is advantageous in that the straight sides of the hollow plug or projection 32 snugly engage the adjacent straight walls of such a rectangular assembling slot 6 to serve as pronounced abutments which positively retain the fastener against rotative shifting or displacement from attached fastening position on said part A. At the same time, the cooperating spaced shoulders 35, 36, defined by abutments 35 and detent 36, respectively, at the ends of the hollow rectangular plug or similar protuberance 31 are adapted to lock the fastener in attached position in the assembling slot 6 against longitudinal shifting or displacement, as aforesaid. The fastener 30 as thus provided, accordingly, defines an attaching structure which also is more or less equivalent to the fastener described with reference to Figs. 1–3, inclusive, and is adapted to be attached in the assembling slot 6 for use in substantially the same way and in a manner to close said assembling slot 6 against the passage of water, dust and other foreign matter. A divisional application Serial Number 416,733, filed March 17, 1954, is directed to the form of invention shown in Figs. 4–6, inclusive.

Figs. 7 and 8 disclose another form of the invention in which the fastener 40 is designed to be attached in the same assembling opening 5 in the supporting part A through which the bolt or screw 15 is applied to secure the supporting part B thereto. This form of fastener, therefore, is advantageous in that only a single opening is required to be provided in the supporting part A and the fastener may be made in relatively small sizes to close the attaching opening 5 against the passage of water, dust and other foreign matter. The imperforate body portion of the fastener in this form of invention is provided preferably with a generally arched base 41 and a depression in the form of a button-like, hollow, cylindrical protuberance 42 which is drawn from the fastener base to project from the underside thereof similarly to the fastener described with reference to Figs. 1-3, inclusive. The hollow protuberance 42 is formed to correspond substantially to the contour of the circular assembling opening 5 to define an annular plug which snugly and frictionally engages substantially the entire periphery of said circular assembling opening 5. The hollow cylindrical protuberance 42 is formed together with a resilient hook or attaching hook 43 stamped from the fastener base and partially from the adjoining peripheral portions of said cylindrical protuberance 42, and which extends in spaced relation to the fastener base 41 a distance approximating the thickness of the supporting part A with the free end of said hook 43 preferably formed into an outwardly flared lip 44. The peripheral surface portions of the cylindrical plug or protuberance 42 on either side of said hook 43 define shoulders or abutments 45 adapted to engage snugly the adjacent wall portions of the assembling opening 5 while the diametrically opposite portion of said protuberance defines a cooperating rounded shoulder or detent 46 which snugly engages the opposing wall of said assembling opening 5 to prevent reverse movement and displacement of the fastener 40 from attached fastening position on the part A. In the bottom of the hollow protuberance 42, suitable stud engaging means in the form of tongues 12, or the like, are provided for threadedly engaging the securing bolt or screw 15, as described with reference to Figs. 1-3, inclusive. The fastener 40, accordingly, defines an attaching structure which is generally equivalent to that described with reference to Figs. 1-3, inclusive, and Figs. 4-6, inclusive, and is adapted to be attached for use in a similar manner to close the assembling opening 5 against the passage of water, dust and other foreign matter.

The improved fasteners of the invention preferably are constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means.

While the invention has been described in detail with specific examples, such examples are intended as illustrations only, inasmuch as it will be apparent that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A clip for securing an article to an apertured panel comprising a sheet metal body, article engaging means integral with said body, a depression in said body defining a protuberance spaced inwardly at all points from the periphery of said body, and a tongue the tip and sides of which are sheared and spaced from said body while the root of said tongue is integral with said protuberance, said tongue being adapted to pass through said panel aperture into clasping engagement with said panel adjacent said aperture, and said protuberance providing a shouldered portion defining an abutment adjacent said tongue and a detent on the substantially opposite side of said protuberance.

2. A clip as claimed in claim 1 wherein the body is bowed lengthwise so as to be concave with respect to the tongue.

3. A clip for securing an article to an apertured panel comprising a sheet metal body, bolt or screw engaging means carried by said body, a depression in said body defining a protuberance spaced inwardly at all points from the periphery of said body, and a tongue the tip and sides of which are sheared and spaced from said body while the root of said tongue is integral with said protuberance, said tongue being adapted to pass through said panel aperture into clasping engagement with said panel adjacent said aperture, and said protuberance providing a shouldered portion defining an abutment adjacent said tongue and a detent on the substantially opposite side of said protuberance.

4. A clip for securing an article to an apertured panel comprising a sheet metal body, a depression in said body defining a protuberance spaced inwardly at all points from the periphery of said body, bolt or screw engaging means carried by said protuberance, and a tongue the tip and sides of which are sheared and spaced from said body while the root of said tongue is integral with said protuberance, said tongue being adapted to pass through said panel aperture into clasping engagement with said panel adjacent said aperture, and said protuberance providing a shouldered portion defining an abutment adjacent said tongue and a detent on the substantially opposite side of said protuberance.

5. A fastener adapted to be attached in fastening position in an opening in a part, said fastener comprising a sheet metal body defining a base having a depression defining a hollow protuberance projecting from the underside of said base said protuberance being spaced inwardly at all points from the periphery of said base and being adapted to be received in said opening in said part, said base and protuberance having a slit portion defining a hook carried by said protuberance, said hook having a free end portion extending laterally outwardly from said hollow protuberance in the same general direction as said base and spaced from said base, said hollow protuberance including wall portions on its sides and having a continuous wall on its periphery except where said hook extends from said protuberance, said hook being adapted to pass through said opening in said part into clasping engagement with said part adjacent said opening in the attached position of the fastener, and said continuous wall of said hollow protuberance being adapted to seat in said opening in said part in engagement with the wall of said opening to lock said hook in said clasping engagement with said part adjacent said opening in said attached position of the fastener, and means included in said fastener for securing an object to said part.

6. A fastener adapted to be attached in fastening position in an opening in a part, said fastener comprising a sheet metal body defining a base having a depression defining a hollow protuberance projecting from the underside of said base, said protuberance being spaced inwardly at all points from the periphery of said base and being adapted to be received in said opening in said part, said base and protuberance having a slit portion defining a hook carried by said protuberance, said hook having a free end portion extending laterally outwardly from said hollow protuberance in the same general direction as said base and spaced from said base, said hollow protuberance including wall portions on its sides and having a continuous wall on its periphery except where said hook extends from said protuberance, said hook being adapted to pass through said opening in said part into clasping engagement with said part adjacent said opening in the attached position of the fastener, said continuous wall of said hollow protuberance being adapted to seat in said opening in said part in engagement with the wall of said opening to lock said hook in said clasping engagement with said part adjacent said opening in said attached position of the fastener, and means carried by said fastener base for engaging a bolt or screw.

7. A fastener adapted to be attached in fastening position in an opening in a part, said fastener comprising a sheet metal body defining a base having a depression defining a hollow protuberance projecting from the underside of said base, said protuberance being spaced inwardly at all points from the periphery of said base and being adapted to be received in said opening in said part, said base and protuberance having a slit portion defining a hook carried by said protuberance, said hook having a free end portion extending laterally outwardly from said hollow protuberance in the same general direction as said base and spaced from said base, said hollow protuberance including wall portions on its sides and having a continuous wall on its periphery except where said hook extends from said protuberance, said hook being adapted to pass through said opening in said part into clasping engagement with said part adjacent said opening in the attached position of the fastener, said continuous wall of said hollow protuberance being adapted to seat in said opening in said part in engagement with the wall of said opening to lock said hook in said clasping engagement with said part adjacent said opening in said attached position of the fastener, and means on said protuberance for engaging a bolt or screw.

References Cited in the file of this patent

UNITED STATES PATENTS

| Number | Name | Date |
| --- | --- | --- |
| Re. 17,823 | Walters | Oct. 7, 1930 |
| 2,165,765 | Place | July 11, 1939 |
| 2,222,449 | Tinnerman | Nov. 19, 1940 |
| 2,251,643 | Tinnerman | Aug. 5, 1941 |
| 2,328,757 | Tinnerman | Sept. 7, 1943 |
| 2,400,545 | Kost | May 21, 1946 |
| 2,666,245 | Fernberg | Jan. 19, 1954 |